United States Patent [19]

Yamamoto et al.

[11] 4,369,650
[45] Jan. 25, 1983

[54] ADJUSTABLE AIR FLOW SENSOR ARRANGEMENT

[75] Inventors: Tadahiro Yamamoto, Yokosuka; Kenji Masaki, Yokohama, both of Japan

[73] Assignee: Nissan Motor Co., Ltd., Yokohama, Japan

[21] Appl. No.: 209,186

[22] Filed: Nov. 21, 1980

[30] Foreign Application Priority Data

Nov. 22, 1979 [JP] Japan .......................... 54-161096[U]

[51] Int. Cl.³ .......................................... G01M 15/00
[52] U.S. Cl. ...................................... 73/118; 123/478
[58] Field of Search ................ 73/3, 118, 204, 861.62, 73/861.63; 123/478

[56] References Cited

U.S. PATENT DOCUMENTS

| 3,550,426 | 12/1970 | Griffo ....................................... 73/3 |
| 3,796,198 | 3/1974 | Mauch et al. . |
| 3,818,877 | 6/1974 | Barrera et al. . |
| 3,975,951 | 8/1976 | Kohama et al. ........................ 73/116 |
| 4,063,905 | 12/1977 | Johnson et al. .................... 48/180 R |
| 4,142,407 | 3/1979 | Kuroiwa et al. ........................ 73/118 |
| 4,264,961 | 4/1981 | Nishimura et al. .................... 73/3 X |

FOREIGN PATENT DOCUMENTS

| 2612427 | 11/1976 | Fed. Rep. of Germany . |
| 2714144 | 11/1977 | Fed. Rep. of Germany . |
| 2197114 | 3/1974 | France . |
| 2243341 | 9/1974 | France . |
| 345839 | 4/1931 | United Kingdom . |
| 677259 | 8/1952 | United Kingdom . |
| 1405367 | 9/1975 | United Kingdom . |
| 371439 | 5/1973 | U.S.S.R. . |

*Primary Examiner*—Jerry W. Myracle
*Attorney, Agent, or Firm*—Thompson, Birch, Gauthier & Samuels

[57] ABSTRACT

A Karman type air flow sensor element is disposed within a duct slidably mounted between members defining an annular space. The annular space causes the intake air to increase its velocity as it approaches the inner periphery of the annular space thus creating a pressure differential zone. By moving the duct so that the inlet and outlet are exposed to different high and low pressures respectively the pressure differential across said the inlet and outlet of the duct can be controlled to vary the fraction of the total intake air inducted therethrough.

4 Claims, 4 Drawing Figures

ADJUSTABLE AIR FLOW SENSOR ARRANGEMENT

BACKGROUND OF THE INVENTION

1. Field of the Invention

The present invention relates generally to an air flow sensor for an internal combustion engine and more particularly to an improved air flow sensor which samples a part of the total air flow and which is adjustable in order to compensate for any mass production tolerances and for any dirt or the like which induces a deviation from the correct air flow indication.

2. Description of the Prior Art

In a known arrangement a hot wire type air flow sensor has been disposed in the induction system of an internal combustion engine to sense the total amount of air inducted into the engine. However, this type of arrangement requires relatively bulky air flow rectifiers to be place both upstream and downstream of the hot wire sensing element and accordingly causes the resistance of the air flow to the engine to be undesirably increased giving rise to pumping losses. Further, the overall length of this arrangement has proven excessive and thus has been difficult to locate in the limited space available in the engine compartment of a vehicle.

SUMMARY OF THE INVENTION

The present invention features a sampling type air flow sensor disposed in a suitable environment such as the air cleaner of the engine and is arranged to be adjustable with respect to a zone in which a relatively low pressure (vacuum) prevails. This permits a variation of amount of air inducted through the sensor by varying the pressure differential across the sensor inlet and outlet. Accordingly, by adjusting the position of the air flow sensor, and thus the amount of air inducted therethrough, the output of the sensor can be adjusted to provide a very accurate indication of the total air intake. This adjustment can be effected at the time of manufacture and after the passing of time to compensate for any foreign matter accumulation within the sensor.

BRIEF DESCRIPTION OF THE DRAWINGS

The features and advantages of the present invention will become more clearly appreciated from the following description taken in conjunction with the accompanying drawings in which like reference numerals denote corresponding elements, and in which.

DETAILED DESCRIPTION OF THE PREFERRED EMBODIMENT

Figure 1:
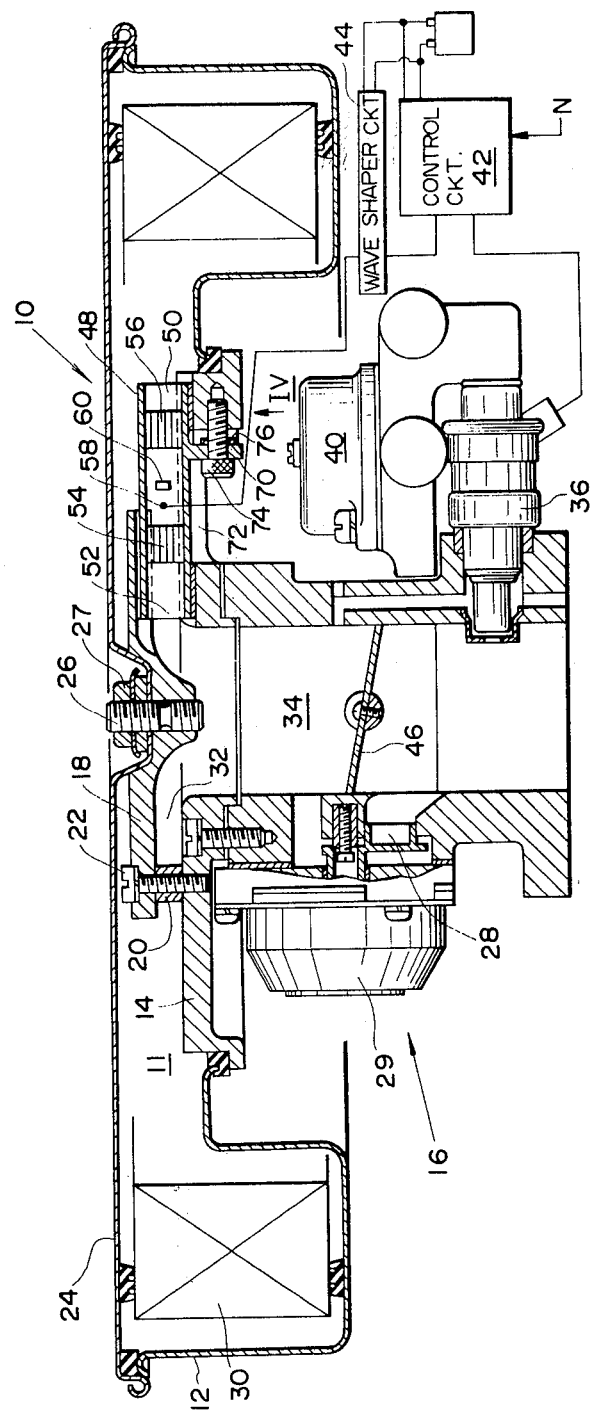
FIG. 1 is a sectional view of a carburetor equipped with an adjustable air flow sensor according to the present invention.
Figure 2:
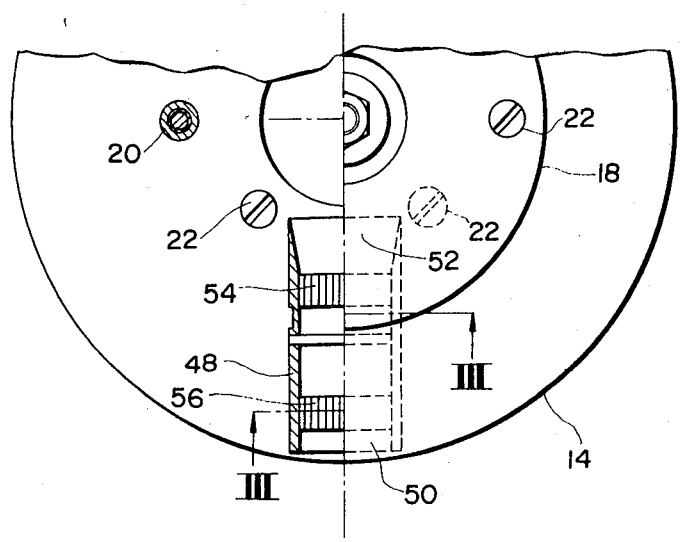
FIG. 2 is a plan view, partially in section, of the air flow sensor shown in FIG. 1.

Turning now to the drawings and in particular to FIG. 1, a sectional view of a carburetor equipped with an air flow sensor according to the present invention is shown. An air flow sensor generally denoted by the numeral 10 is disposed as shown within the clean zone 11 of an air cleaner 12. The air flow sensor is mounted on an adaptor plate 14 which is fixedly secured to the top of the downdraft type carburetor 16. Spacedly mounted to the adaptor 14 is a cover 18, which is secured to and spaced from the adaptor by means of spacers 20 and bolts 22 intermittently spaced around the periphery of the cover 18 (see FIG. 2). An air cleaner lid 24 is in turn fastened to the cover 18 by a suitable stud bolt 26 and nut 27. Enclosed within the air cleaner 12 is an air filter element 30 through which air must pass before passing through the annular space 32 defined between the air flow sensor adaptor plate 14 and the cover 18 to enter the throttle chamber 34 of the carburetor 16.

The carburetor 16 is equipped with a so called single point fuel injector 36 which cooperates with a pressure regulator 40, a control circuit 42 which receives various inputs such as an engine speed signal N and a signal from a wave shaper circuit 44 which is in turn connected to the air flow sensor 10 to be responsive to the output thereof. The carburetor is further provided with an idling by-pass passage 28 and air flow regulator 29 for controlling the amount of air fed to the engine when the throttle valve 46 is closed.

Figure 3:
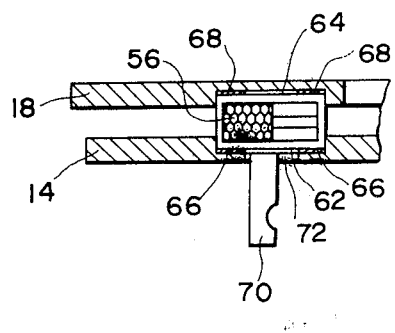
FIG. 3 is a sectional view taken along section line III—III.
Figure 4:
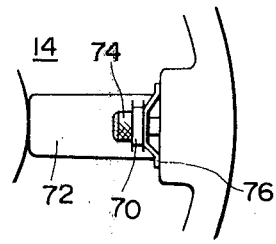
FIG. 4 is a view from the direction of arrow IV in FIG. 1.

The air flow sensor 10 in the embodiment is a Karman vortex type air flow sensor having an elongate rectangular cross sectioned duct 48 which is oriented in the radial direction of the annular space 32. The duct has an inlet 50 and an outlet 52. The outlet 52 is arranged near the inlet of the throttle chamber 34. Rectifiers 54, 56 comprised of honeycombs of parallel passages or layers are disposed upstream and downstream of a hot wire 58 and a vortex generator 60. As shown the vortex generator 60 is located upstream of the hot wire 58 to induce eddy currents which cool the hot wire and thus effect the electrical resistance thereof. The duct 48 is slidably mounted in appropriate recess 62, 64 (best shown in FIG. 3) respectively formed in the adpator plate 14 and the cover 18. Bearings 66,68 formed of a suitable material such as polytetrafluroethylene (Teflon) are interposed between the duct and the recess 62, 64 to ensure smooth sliding of the duct therein. A boss or arm 70 formed on the duct depends through an elongate slot 72 formed in the adaptor plate 14. The boss is formed with a through hole through which an adjust screw 74 extends to be threadedly engaged in a threaded bore formed in the adaptor plate. A suitable spring 76 such as spring plate or coil spring is disposed about the adjust screw as shown (see FIG. 4) to bias the boss in a direction counter the tightening direction of the adjust screw 74.

In operation, as the cross sectional area available for the intake air to flow through the annular space 32 decreases as the air approaches the throttle chamber 34, the velocity of the air will increase to induce a low pressure zone to prevail at the inner periphery of the annular space as compared with a relatively high pressure zone at the outer periphery thereof. Thus with the radial disposition of the air flow sensor duct 48 the inlet thereof 50 will be exposed to the relatively high pressure zone while the outlet 52 will be exposed to the low pressure zone. It will be of course appreciated that the pressure steadily decreases from the other periphery of the annular space 32 to the inner periphery in accordance with the decreasing cross sectional area and the corresponding increase in fluid flow rate to create a pressure differential zone. Hence, by varying the location of the air flow sensor duct 48 within the annular space it is possible to vary the pressure differential which exists across the inlet and outets thereof and therefor control the amount of fluid inducted therethrough. The generation of eddy currents in the air flow sensor and the corresponding change in the electrical resistance of the wire 58 can be accordingly controlled.

Given that Va = the amount of air inducted through the annular space 32 and Vb = the amount of air inducted through the air sensor duct 48 it will be appreciated that:

$$Va + Vb = \text{The total intake air volume} \qquad (1)$$

and given that: Va/Vb is essentially constant, viz.,
$$Va/Vb = k \qquad (2)$$

which can be transposed to:

$$Va = k \cdot Vb \qquad (3)$$

then by substituting for Va in eqn. (1) we get $$K \cdot Vb + Vb = \text{The total intake air volume} \qquad (4)$$

or $$(k+1) \cdot Vb = \text{The total intake air volume} \qquad (5)$$

Therefore, from eqn.(5) it can be appreciated that the total volume of intake air is a function of Vb and as Vb can be readily adjusted by rotating the adjust screw 74, the output of the air flow sensor 10 can be adjusted to an appropriate level by using an accurately calibrated diagnostic air flow meter and adjusting the adjust screw 74 until the indicated air flow matches the air flow indicated by the diagnostic device.

Accurate setting of the output of the air flow sensor of course prevents any unwanted enriching or leaning of the air-fuel mixture produced by the fuel injector 36.

Further, it will be appreciated that the invention is not limited to the use of "Karman" type air flow sensors and any suitable type may be employed without departing from the scope of the present invention. It will also be appreciated that an adjustable baffle plate or the like may be used in place of the slidable duct arrangement as described hereinbefore, which controls the cross sectional area of either one or both of the inlet and outlets of the duct in which the air flow sensing mechanism is mounted.

A further merit of the present invention is found in the compactness of the arrangement wherein the sensor is disposed within the air cleaner without inducing any noticable increase in the dimensions thereof.

What is claimed is:

1. In an internal combustion engine having a combustion chamber and an induction passage leading from the ambient atmosphere to said combustion chamber,
    an air flow sensor comprising:
    a duct in said induction passage, said duct having an inlet and an outlet and through which flows a fraction of the total intake air received via said induction passage;
    flow velocity increasing means for locally increasing the rate of flow of the air passing through said induction passage to create a pressure gradient zone; and
    an adjusting device for varying the fraction of the total intake air permitted to flow through said duct, said adjusting device including a mechanism for moving said duct within said pressure gradient zone to vary the pressure differential across the inlet and outlet of said duct.

2. An air flow sensor as claimed in claim 1 wherein said flow velocity increasing means takes the form of first and second members which define an annular space therebetween; and
    said mechanism for moving said duct includes
    means for slidingly supporting said duct in said annular space; and
    an adjust screw operatively interconnecting said duct and one of said first and second members.

3. An air flow sensor as claimed in claim 1 or 2 further comprising a carburetor equipped with a fuel injector which is controlled in response to the output of said air flow sensor.

4. An air flow sensor as claimed in claim 3 wherein said air flow sensor is disposed in an air cleaner mounted on said carburetor and wherein said first and second members serve to mount the lid of the air cleaner.

* * * * *